United States Patent
Indurkar

(10) Patent No.: US 11,310,654 B1
(45) Date of Patent: Apr. 19, 2022

(54) ELECTRONIC SUBSCRIBER IDENTITY MODULE (ESIM) PROFILE DELIVERY AND ACTIVATION SYSTEM AND METHODS

(71) Applicant: T-MOBILE INNOVATIONS LLC, Overland Park, KS (US)

(72) Inventor: Dhananjay Indurkar, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 36 days.

(21) Appl. No.: 17/023,347

(22) Filed: Sep. 16, 2020

(51) Int. Cl.
*H04M 3/00* (2006.01)
*H04W 8/18* (2009.01)

(52) U.S. Cl.
CPC ..................... *H04W 8/18* (2013.01)

(58) Field of Classification Search
CPC ........................................ H04W 8/18
USPC ........................................ 455/418
See application file for complete search history.

(56) References Cited

U.S. PATENT DOCUMENTS

| | | | |
|---|---|---|---|
| 10,455,536 B1 * | 10/2019 | Khawand | H04W 8/183 |
| 10,833,929 B2 | 11/2020 | Watsen et al. | |
| 10,880,711 B1 | 12/2020 | Holmes | |
| 10,887,741 B1 | 1/2021 | Indurkar | |
| 11,102,646 B1 | 8/2021 | Indurkar | |
| 11,115,810 B1 | 9/2021 | Indurkar | |
| 11,140,543 B1 * | 10/2021 | Indurkar | H04L 67/12 |
| 11,190,985 B1 * | 11/2021 | Indurkar | H04L 63/102 |
| 2011/0246374 A1 | 10/2011 | Franz | |
| 2015/0303966 A1 * | 10/2015 | Lee | H04L 67/306 455/466 |
| 2015/0334552 A1 | 11/2015 | Li et al. | |
| 2016/0020802 A1 * | 1/2016 | Lee | H04B 1/3816 455/558 |

(Continued)

FOREIGN PATENT DOCUMENTS

| | | |
|---|---|---|
| DE | 102016201360 A1 | 8/2016 |
| EP | 2448301 A1 | 5/2012 |

OTHER PUBLICATIONS

Notice of Allowance dated Jun. 14, 2021, U.S. Appl. No. 16/880,723, filed May 21, 2020.

(Continued)

*Primary Examiner* — Mark G. Pannell

(57) ABSTRACT

An electronic subscriber identity module (eSIM) profile delivery and activation system is disclosed comprising a user equipment that includes an eSIM, a WIFI transceiver, a radio modem, and an application. The application is configured to detect that the eSIM is not initially provisioned with an eSIM profile, and in response to the detection, request, receive, and store via the WIFI transceiver a branding information handle from an over-the-air (OTA) platform in the eSIM, and reboot the eSIM and/or the radio modem. The radio modem is configured to receive the branding information handle stored in the eSIM after reboot, determine which subscription manager data preparation (SMDP+) server to access based on the handle, and obtain and configure the eSIM profile from the SMDP+ server into the eSIM. The radio modem is subsequently rebooted and configured to communicate with a carrier specific OTA platform to finalize activation of the eSIM profile.

20 Claims, 8 Drawing Sheets

(56) References Cited

U.S. PATENT DOCUMENTS

| | | | |
|---|---|---|---|
| 2016/0020803 A1* | 1/2016 | Cha | H04W 8/18 |
| | | | 455/558 |
| 2016/0021484 A1* | 1/2016 | Park | H04W 4/24 |
| | | | 455/418 |
| 2016/0092145 A1 | 3/2016 | Manning et al. | |
| 2016/0119780 A1* | 4/2016 | Jung | H04W 8/265 |
| | | | 455/419 |
| 2016/0246611 A1 | 8/2016 | Li et al. | |
| 2016/0255567 A1 | 9/2016 | Petersson et al. | |
| 2016/0269891 A1 | 9/2016 | Chen et al. | |
| 2016/0308768 A1* | 10/2016 | Yoon | H04W 48/18 |
| 2017/0289788 A1 | 10/2017 | Lalwaney | |
| 2018/0014178 A1* | 1/2018 | Baek | H04W 8/20 |
| 2018/0014184 A1 | 1/2018 | Schell et al. | |
| 2019/0058983 A1* | 2/2019 | Guven | H04W 8/183 |
| 2019/0058989 A1* | 2/2019 | Park | H04W 88/06 |
| 2019/0132204 A1 | 5/2019 | McGrath et al. | |
| 2019/0140837 A1 | 5/2019 | Cheng et al. | |
| 2019/0208405 A1* | 7/2019 | Park | H04W 8/183 |
| 2020/0120494 A1 | 4/2020 | Fares et al. | |
| 2020/0154263 A1* | 5/2020 | Guday | H04W 8/183 |
| 2020/0178070 A1 | 6/2020 | Yang et al. | |
| 2020/0221294 A1 | 7/2020 | Kang et al. | |
| 2020/0228488 A1 | 7/2020 | Xu et al. | |
| 2020/0236529 A1 | 7/2020 | Anslot et al. | |
| 2020/0260241 A1 | 8/2020 | Sicard | |
| 2020/0322846 A1 | 10/2020 | Hampali et al. | |
| 2020/0322884 A1 | 10/2020 | Di Girolamo et al. | |
| 2020/0351651 A1 | 11/2020 | Koo et al. | |
| 2020/0351761 A1 | 11/2020 | Horna | |
| 2020/0389783 A1 | 12/2020 | Kang et al. | |
| 2020/0404501 A1 | 12/2020 | Kang et al. | |
| 2021/0029761 A1 | 1/2021 | Jung et al. | |
| 2021/0076195 A1 | 3/2021 | Chaugule et al. | |
| 2021/0112401 A1 | 4/2021 | Chadwick et al. | |
| 2021/0112413 A1* | 4/2021 | Pazhyannur | H04L 63/105 |
| 2021/0120387 A1 | 4/2021 | Roy et al. | |
| 2021/0120424 A1 | 4/2021 | Kang et al. | |
| 2021/0306830 A1* | 9/2021 | Williams | H04W 4/50 |
| 2021/0377722 A1* | 12/2021 | Fan | H04W 8/183 |
| 2021/0377808 A1* | 12/2021 | Indurkar | H04L 47/14 |

OTHER PUBLICATIONS

FAIPP Pre-Interview Communication dated Apr. 15, 2021, U.S. Appl. No. 16/880,723, filed May 21, 2020.

Indurkar, Dhananjay, et al., "Embedded Subscriber Identity Module (eSIM) Profile Adaptation Based on Context," filed May 21, 2020, U.S. Appl. No. 16/880,723.

Notice of Allowace dated May 19, 2021, U.S. Appl. No. 16/821,937, filed Mar. 17, 2020.

FAIPP Pre-Interview Communication dated Mar. 26, 2021, U.S. Appl. No. 16/821,937, filed Mar. 17, 2020.

Indurkar, Dhananjay, et al., "Bootstrap Electronic Subscriber Identity Module Configuration," filed Mar. 17, 2020, U.S. Appl. No. 16/821,937.

Notice of Allowance dated Apr. 29, 2021, U.S. Appl. No. 16/821,943, filed Feb. 19, 2021.

FAIPP Pre-Interview Communication dated Jan. 29, 2021, U.S. Appl. No. 16/821,943, filed Feb. 19, 2021.

Indurkar, Dhananjay, et al., "Triggering Electronic Subscriber Identity Module Activation", filed Mar. 17, 2020, U.S. Appl. No. 16/821,943.

Notice of Allowance dated Sep. 4, 2020, U.S. Appl. No. 16/821,950, filed Feb. 17, 2020.

Indurkar, Dhananjay, et al., "Activation Communication Addresses of Internet of Things Devices", filed Nov. 24, 2020, U.S. Appl. No. 17/102,627.

FAIPP Pre-Interview Communication dated Apr. 5, 2021, U.S. Appl. No. 16/886,521, filed May 28, 2020.

Indurkar, Dhananjay, et al., "Internet of Things (IoT) Devices Wireless Communication Service Management Platform" filed May 28, 2020, U.S. Appl. No. 16/886,521.

Indurkar, Dhananjay, et al., "Electronic Subscriber Identity Module (eSIM) Profile Provisioning" filed Sep. 16, 2020, U.S. Appl. No. 17/023,352.

Indurkar, Dhananjay, et al., "Embedded Subscriber Identity Module (eSIM) Profile Adaptation Based on Context," filed May 18, 2021, International Application No. PCT/US21/33041.

Indurkar, Dhananjay, et al., "Internet of Things (IoT) Devices Wireless Communication Service Management Platform" filed May 24, 2021, International Application No. PCT/US21/33922.

Notice of Allowance dated Aug. 10, 2021, U.S. Appl. No. 16/886,521, filed May 28, 2020.

Indurkar, Dhananjay, "Embedded Subscriber Identity Module (eSIM) Profile Adaptation Based on Context," filed Aug. 27, 2021, U.S. Appl. No. 17/459,763.

Indurkar, Dhananjay, "Bootstrap Electronic Subscriber Identity Module Configuration," filed Aug. 20, 2021, U.S. Appl. No. 17/408,366.

Foreign Communication From a Related Counterpart Application, International Search Report and Written Opinion dated Sep. 28, 2021, International Application No. PCT/US2021/033041 filed on May 18, 2021.

* cited by examiner

ELECTRONIC SUBSCRIBER IDENTITY MODULE (ESIM) PROFILE DELIVERY AND ACTIVATION SYSTEM AND METHODS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some wireless communication devices are provided with an embedded electronic subscriber identity module (eSIM) that defines wireless communication service provider data and wireless communication service subscriber data. A wireless communication device may be provisioned for wireless communication service on a radio access network (RAN) by loading appropriate data into the eSIM in the wireless communication device.

SUMMARY

In an embodiment, an electronic subscriber identity module (eSIM) profile delivery and activation system is disclosed. The system comprises a user equipment (UE) that comprises an eSIM that is not initially provisioned with an eSIM profile, a WIFI transceiver, a non-transitory memory, and a processor. The UE also comprises an application stored in the non-transitory memory, that when executed by the processor, detects that the eSIM is not initially provisioned with an eSIM profile, in response to the detecting, requests via the WIFI transceiver a branding information handle from an over-the-air (OTA) platform, receives and stores via the WIFI transceiver the branding information handle from the OTA platform in the eSIM, and reboots at least one of the eSIM or a radio modem of the wireless electronic device. The UE further comprises the radio modem. After the rebooting, the radio modem is configured to receive the branding information handle stored in the eSIM, determine which subscription manager data preparation (SMDP+) server to access based on the branding information handle, obtain the eSIM profile from the SMDP+ server, and configure the eSIM profile into the eSIM. The radio modem is rebooted after configuring the eSIM profile into the eSIM. The radio modem is also configured to subsequently communicate with a carrier specific OTA platform to finalize activation of the eSIM profile.

In another embodiment, an electronic subscriber identity module (eSIM) profile delivery and activation method is disclosed. The method comprises detecting, by an application stored in a non-transitory memory of a user equipment (UE) and executable by a processor of the UE, that an eSIM on the UE is not initially provisioned with an eSIM profile, in response to the detecting, requesting, by the application via a WIFI transceiver of the UE, a branding information handle from an over-the-air (OTA) platform, and receiving and storing, by the application via the WIFI transceiver, the branding information handle from the OTA platform in the eSIM. The method also comprises rebooting, by the application, at least one of the eSIM or a radio modem of the UE, after rebooting, receiving, by the radio modem, the branding information handle stored in the eSIM, determining, by the radio modem, which subscription manager data preparation (SMDP+) server to access based on the branding information handle, and obtaining, by the radio modem, the eSIM profile from the SMDP+ server. The method further comprises configuring, by the radio modem, the eSIM profile into the eSIM, rebooting the radio modem after configuring the eSIM profile into the eSIM, and subsequently communicating, by the radio modem, with a carrier specific OTA platform to finalize activation of the eSIM profile.

In yet another embodiment, an electronic subscriber identity module (eSIM) profile delivery and activation method is disclosed. The method comprises detecting, by an application stored in a non-transitory memory of a user equipment (UE) and executable by a processor of the UE, that an eSIM on the UE is not initially provisioned with an eSIM profile, in response to the detecting, requesting, by the application via a WIFI transceiver of the UE, a branding information handle from an over-the-air (OTA) platform, and receiving and storing, by the application via the WIFI transceiver, the branding information handle from the OTA platform in the eSIM. The method also comprises rebooting, by the application, at least one of the eSIM or a radio modem of the UE, after rebooting, receiving, by the radio modem, the branding information handle stored in the eSIM, determining, by the radio modem, which subscription manager data preparation (SMDP+) server to access based on the branding information handle, and obtaining, by the radio modem, the eSIM profile from the SMDP+ server. The method further comprises configuring, by the radio modem, the eSIM profile into the eSIM, rebooting the radio modem after configuring the eSIM profile into the eSIM, and subsequently communicating, by the radio modem, with a carrier specific OTA platform associated with a wireless communication service provider to finalize activation of the eSIM profile. The method additionally comprises storing, by the carrier specific OTA platform, the eSIM profile in a database as associated with an entity other than a user of the UE during a trial period, after the trial period concludes and based on a request from the user to continue service associated with the eSIM profile, creating, by the wireless communication service provider, a new account for the user or locating, by the wireless communication service provider, an existing account associated with the user, and reassigning, by the carrier specific OTA platform, the eSIM profile from the entity to the new account or the existing account.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
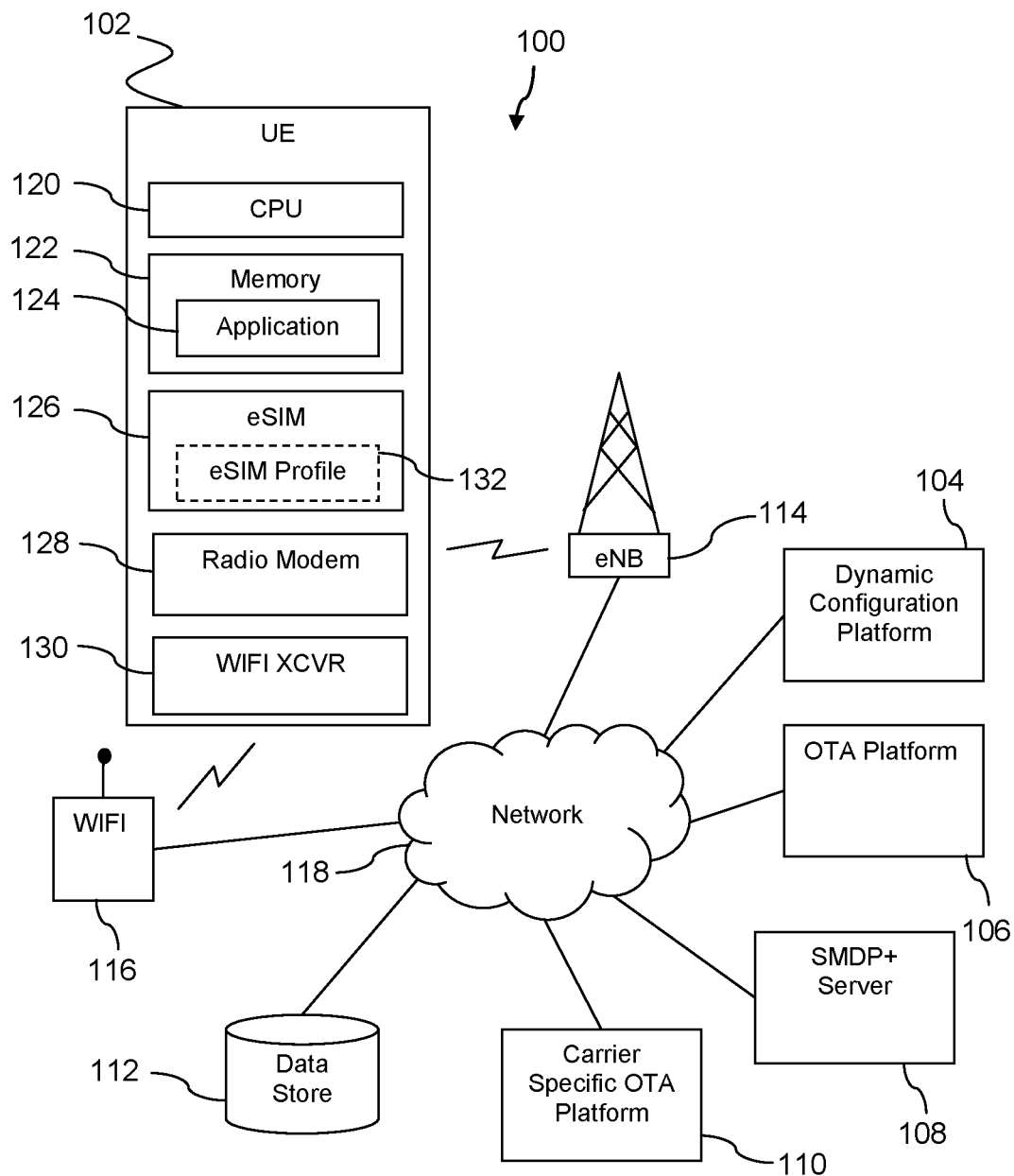
FIG. 1 is a block diagram of a wireless communication network according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The pending application is directed to providing cellular communication connectivity to a wireless communication device through delivery and activation of an electronic subscriber identity module (eSIM) profile to the wireless communication device. In one particular use case, the system and methods disclosed herein are for providing cellular communication connectivity to a personal computer. Continuing with the personal computer use case, the personal computer includes an eSIM. However, the eSIM is not initially provisioned with an eSIM profile to enable cellular communication connectivity. Since cellular communication connectivity is not initially available, traditional eSIM profile provisioning (i.e., activation and branding) over-the-air such as is done with mobile phones is not an option. Instead, the eSIM profile delivery and activation system and methods discussed herein initially use WIFI, which poses some extra challenges not faced with traditional mobile phone eSIM profile provisioning.

On first startup of the personal computer, a dynamic configuration platform may be triggered by the personal computer. The dynamic configuration platform may force the eSIM and/or the radio modem to reboot. On reboot, the eSIM detects that it is not yet configured with branding information and consequently the personal computer may reach out via WIFI to an over-the-air (OTA) platform for a branding information handle to branding information. The OTA platform may provide the branding information handle to the personal computer via the WIFI link. This branding information handle may be one or more of (a) an integrated circuit card identifier (ICCIID), (b) an international mobile subscriber identity (IMSI), and/or (c) a public land mobile network (PLMN) identifier. This branding information handle may be stored in the eSIM.

After receipt and storage of the branding information handle, the eSIM and/or the radio modem may reboot. On reboot, the radio modem may read the branding information handle from the eSIM, determine based on the branding information handle what SMDP+ server to access, obtains an eSIM profile from the SMDP+ server, and configure the eSIM profile into the eSIM. The radio modem may then reach out to a carrier specific OTA platform to cause it to program the phone number and complete other housekeeping on the eSIM profile to finalize activation of the eSIM profile. The radio modem may then reboot a third time to take cognizance of the updated eSIM profile.

In some cases, an original equipment manufacturer or a wireless communication service provider may initially provide cellular service to a newly purchased personal computer for a trial period as a marketing initiative. This can be completed by configuring the eSIM of the personal computer by the process described above. Additionally, some further steps may involve seamlessly transferring or reassigning the eSIM profile configured into the personal computer during the free trial to an existing subscriber account associated with an owner of the personal computer or a new subscriber account established by the owner of the personal computer. This avoids having to delete an eSIM profile associated with the original equipment manufacturer (OEM) or wireless communication service provider and replacing that eSIM profile with a new eSIM profile, thereby saving network resources. After reassignment of the eSIM profile to the existing subscriber account or the new subscriber account, the eSIM profile may be updated by the carrier specific OTA platform sending updated branding elements (e.g., different access point names) to the personal computer.

While discussed above with respect to a personal computer, these same concepts can be applied to other wireless communication devices such as an Internet of Things (IoT) device, a mobile phone, a smart phone, a personal digital assistant (PDA), a media player, a wearable computer, a headset computer, or another wireless communication device. In different devices, there may be different sequences of reboots. For example, initially the eSIM may be rebooted alone. After the eSIM initially reboots, it may not be necessary for it to reboot again, and rather only the radio modem may need to reboot. In some cases, the radio modem may reset instead of rebooting.

Turning now to FIG. 1, a system 100 is described. In an embodiment, the system 100 comprises a UE 102, a dynamic configuration platform 104, an OTA platform 106, a SMDP+ server 108, a carrier specific OTA platform 110, a data store 112, an eNodeB (eNB) 114, a WIFI access point 116, and a network 118.

The UE 102 may comprise a processor 120 and a memory 122. The memory 122 may comprise a non-transitory memory portion that stores an application 124. The UE 102 may also comprise an eSIM 126, a radio modem 128, and a WIFI transceiver 130. The eSIM 126 may comprise an embedded universal integrated circuit card (eUICC). In an embodiment, the eSIM 126 is not initially provisioned with an eSIM profile 132. The UE 102 may be a mobile phone, a PDA, a media player, a wearable computer, a headset computer, a laptop computer, a tablet computer, a notebook computer, an IoT device, or any combination thereof.

The radio modem 128 may comprise a cellular radio transceiver and a processor. Alternatively, the cellular radio transceiver may be a separate component from the radio modem 128. In some contexts, the radio modem 128 may be referred to as a cellular radio modem. The UE 102 may establish a wireless communication link with the eNB 114 to provide access to the network 118 using any of a variety of wireless communication protocols including a 5G wireless communication protocol, a code division multiple access (CDMA) wireless communication protocol, a global system for mobile communication (GSM) wireless communication protocol, a long-term evolution (LTE) wireless communication protocol, or another wireless communication protocol. In some contexts, the eNB 114 may be referred to as a base transceiver station (BTS), a cell tower, or cell site.

The UE 102 may also be configured to use the WIFI transceiver 130 to establish a wireless communication link with the WIFI access point 116 to provide access to the network 118. The network 118 may comprise one or more private networks, one or more public networks, or a combination thereof. For example, the network 114 may comprise a radio access network (RAN) of a telecommunications service provider. The UE 102 may access the network 118 to obtain a variety of communication services.

The dynamic configuration platform 104 may be a server computer. Server computers are discussed in more detail hereinafter. In an embodiment, the dynamic configuration platform 104 is triggered by the UE 102. For example, the dynamic configuration platform 104 may be triggered on a first startup of the UE 102. The dynamic configuration platform 104 may force the eSIM 126 and/or the radio modem 128 to reboot.

After reboot, the application 124 may be configured to detect that the eSIM 126 is not initially provisioned with an eSIM profile 132. Since the eSIM 126 is not initially provisioned with an eSIM profile 132, traditional eSIM profile provisioning over-the-air using the cellular network is not available. Thus, in an embodiment, the application 124 is configured to request via the WIFI transceiver 130 a branding information handle from the over-the-air (OTA) platform 106 in response to detecting that the eSIM 126 is not initially provisioned with an eSIM profile 132. The application 124 may receive the branding information handle from the OTA platform 106 via the WIFI transceiver 130 and store the branding information handle in the eSIM 126. The branding information handle may comprise one or more of an ICCID, an IMSI, a PLMN identifier, or another identifier. After the branding information handle is stored in the eSIM 126, the application 124 may reboot at least one of the eSIM 126 or the radio modem 128.

After rebooting, the radio modem 128 may be configured to receive the branding information handle stored on the eSIM 126. Based on the branding information handle, the radio modem 128 may be configured to determine which SMDP+ server 108 out of a plurality of SMDP+ servers to access. In an embodiment, based on that determination, the radio modem 128 obtains the eSIM profile 132 from the SMDP+ server 108 and configures the eSIM profile 132 received from the SMDP+ server 108 into the eSIM 126. The eSIM profile 132 may comprise one or more of radio access network access credentials, a phone number or an IMSI, a preferred roaming list (PRL), one or more access point names (APNs), branding content, executable applications, or other data artifacts. After configuring the eSIM profile 132 into the eSIM 126, the radio modem 128 may be rebooted.

Following the reboot of the radio modem 128, the radio modem 128 may be configured to communicate with the carrier specific OTA platform 110 to finalize activation of the eSIM profile 132. The carrier specific OTA platform 110 may be associated with a wireless communication service provider. To finalize activation of the eSIM profile 132, the carrier specific OTA platform 110 may program a phone number associated with the eSIM profile 132. In an embodiment, the carrier specific OTA platform 110 stores the eSIM profile 132 as associated with a new subscriber account or an existing subscriber account in the data store 112.

In an alternative embodiment, an original equipment manufacturer (OEM) of the UE 102 or the wireless communication service provider may initially provide cellular service to a newly purchased personal computer for a trial period as a marketing initiative. In such an alternative embodiment, the carrier specific OTA platform 110 stores the eSIM profile 132 in the data store 112 as associated with an entity (e.g., the OEM or the wireless communication service provider) other than a user of the UE 102 during the trial period. After the trial period concludes and based on a request from the user to continue service associated with the eSIM profile 132, the wireless communication service provider may create a new account for the user or locate an existing account associated with the user. The carrier specific OTA platform 110 may then reassign the eSIM profile 132 from the OEM or the wireless communication service provider to the new account or the existing account. This avoids having to delete the eSIM profile 132 and replace it with a new eSIM profile, thereby saving network resources. After reassignment of the eSIM profile 132 to the existing subscriber account or the new subscriber account, the carrier specific OTA platform 110 may update the eSIM profile 132 by sending updated branding elements to the UE 102. The updated branding elements may comprise different APNs or other data.

The OTA platform 106, the SMDP+ server 108, and the carrier specific OTA platform 110 may be server computers. Server computers are discussed in more detail hereinafter. It is understood that any number of UEs 102, OTA platforms 106, SMDP+ servers 108, carrier specific OTA platforms 110, data stores 112, eNBs 114, and WIFI access points 116 may exist in the system 100.

Figure 2:
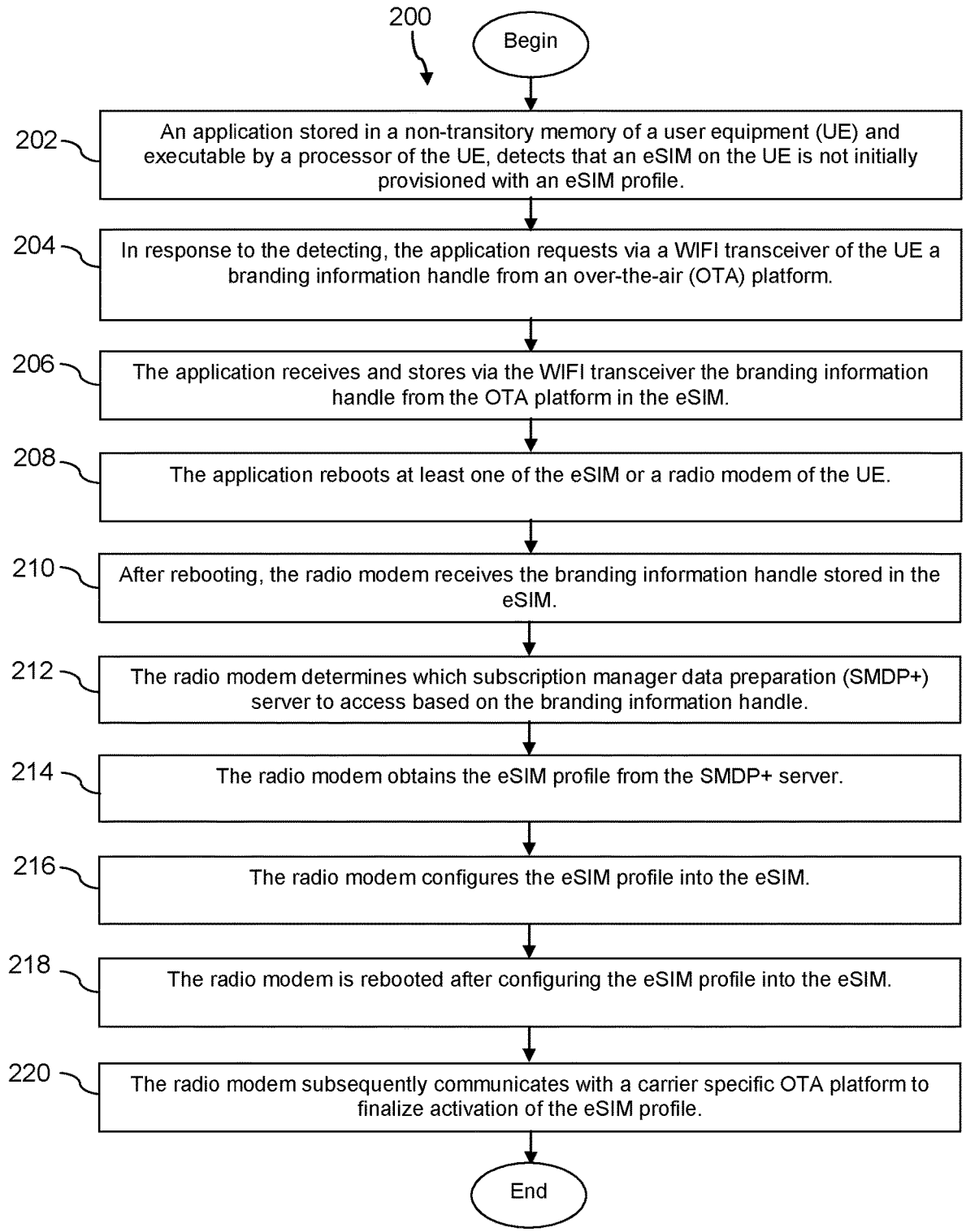
FIG. 2 is a flow chart of a method according to an embodiment of the disclosure.

Turning now to FIG. 2, a method 200 is described. At block 202, an application stored in a non-transitory memory of a UE and executable by a processor of the UE (e.g., application 124 on UE 102), detects that an eSIM (e.g., eSIM 126) on the UE is not initially provisioned with an eSIM profile (e.g., eSIM profile 132). At block 204, in response to the detecting, the application requests via a WIFI transceiver (e.g., WIFI transceiver 130) of the UE a branding information handle from an OTA platform (e.g., OTA platform 106). At block 206, the application receives and stores via the WIFI transceiver the branding information handle from the OTA platform in the eSIM. At block 208, the application reboots at least one of the eSIM or a radio modem (e.g., radio modem 128) of the UE. At block 210, after rebooting, the radio modem receives the branding information handle stored in the eSIM.

At block 212, the radio modem determines which SMDP+ server (e.g., SMDP+ server 108) to access based on the branding information handle. At block 214, the radio modem obtains the eSIM profile from the SMDP+ server. At block 216, the radio modem configures the eSIM profile into the eSIM. At block 218, the radio modem is rebooted after configuring the eSIM profile into the eSIM. At block 220, the radio modem subsequently communicates with a carrier specific OTA platform (e.g., carrier specific platform 110) to finalize activation of the eSIM profile.

Figure 3A:
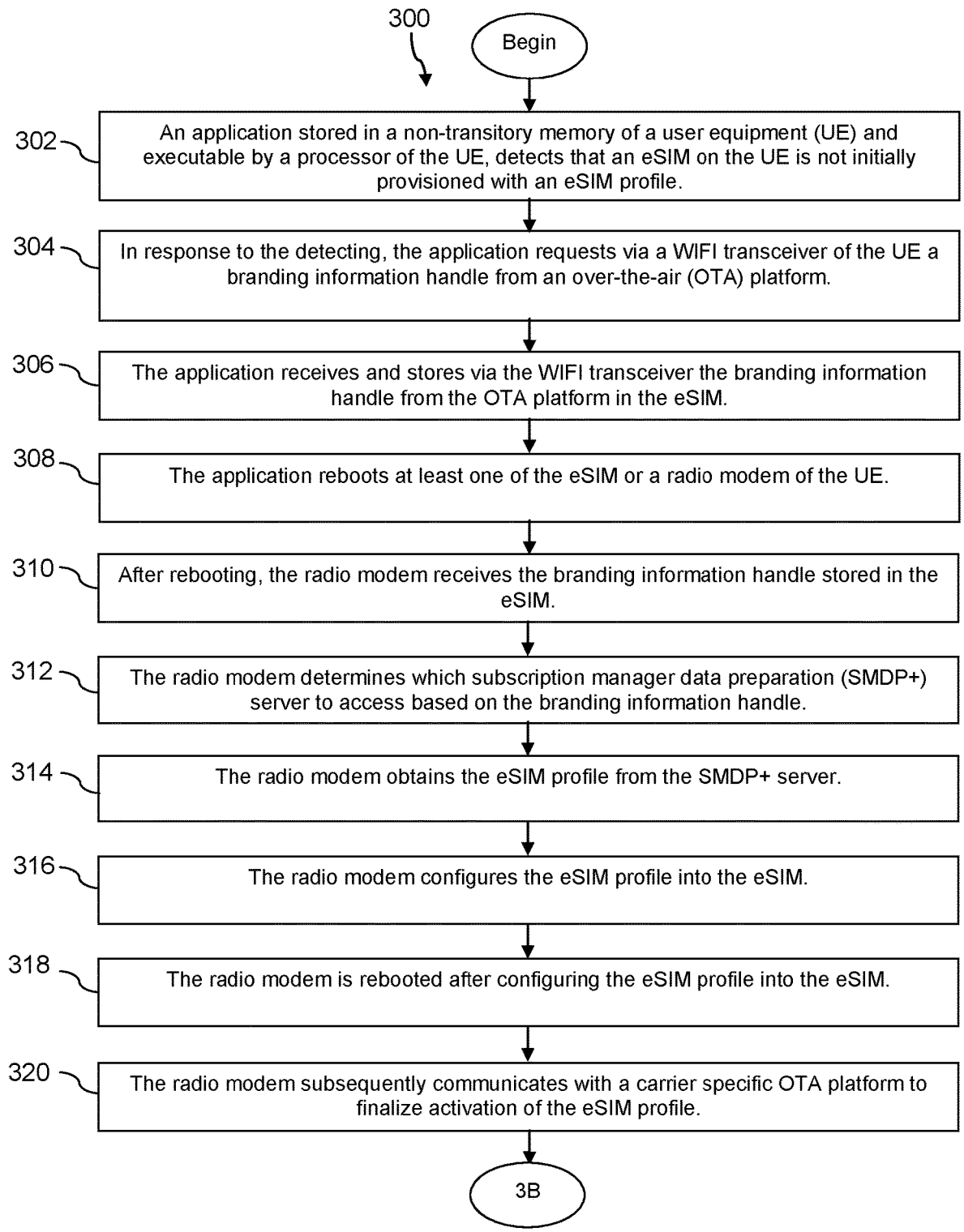
FIGS. 3A and 3B are a flow chart of another method according to an embodiment of the disclosure.
Figure 3B:
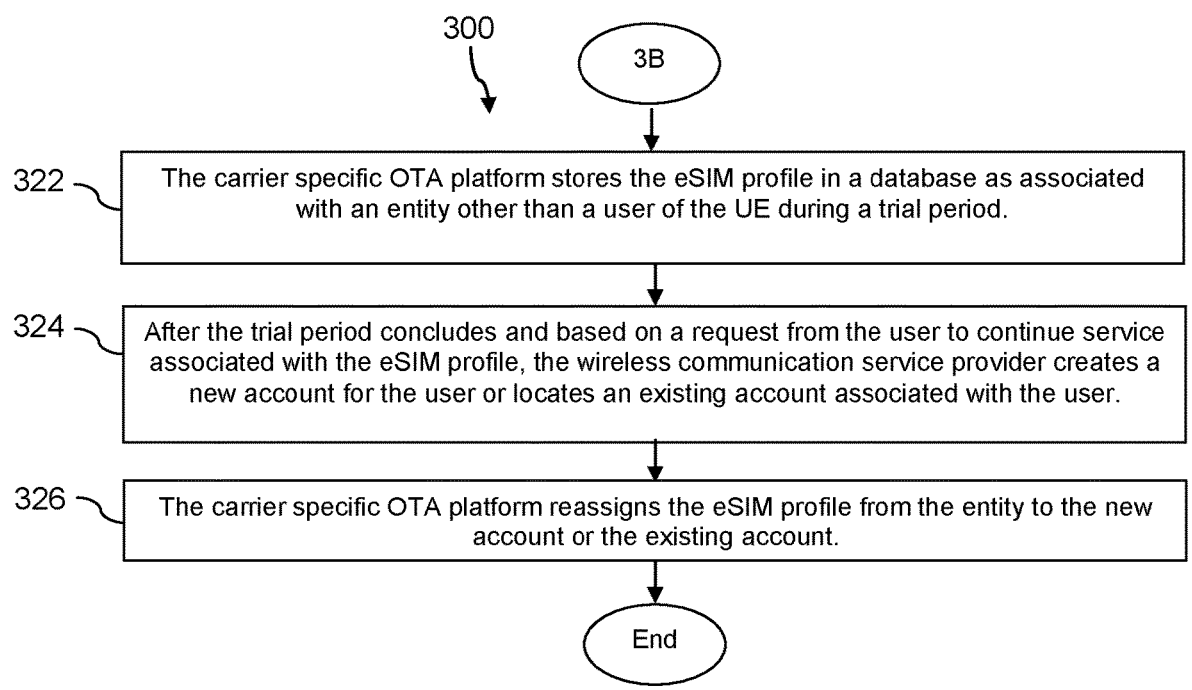

Turning now to FIG. 3, a method 300 is described. Blocks 302 to 320 are substantially similar to blocks 202 to 220 discussed above with respect to FIG. 2. At block 322, the carrier specific OTA platform stores the eSIM profile in a database (e.g., data store 112) as associated with an entity other than a user of the UE during a trial period. At block 324, after the trial period concludes and based on a request from the user to continue service associated with the eSIM profile, the wireless communication service provider creates a new account for the user or locates an existing account associated with the user. At block 326, the carrier specific OTA platform reassigns the eSIM profile from the entity to the new account or the existing account associated with the user.

Figure 4:
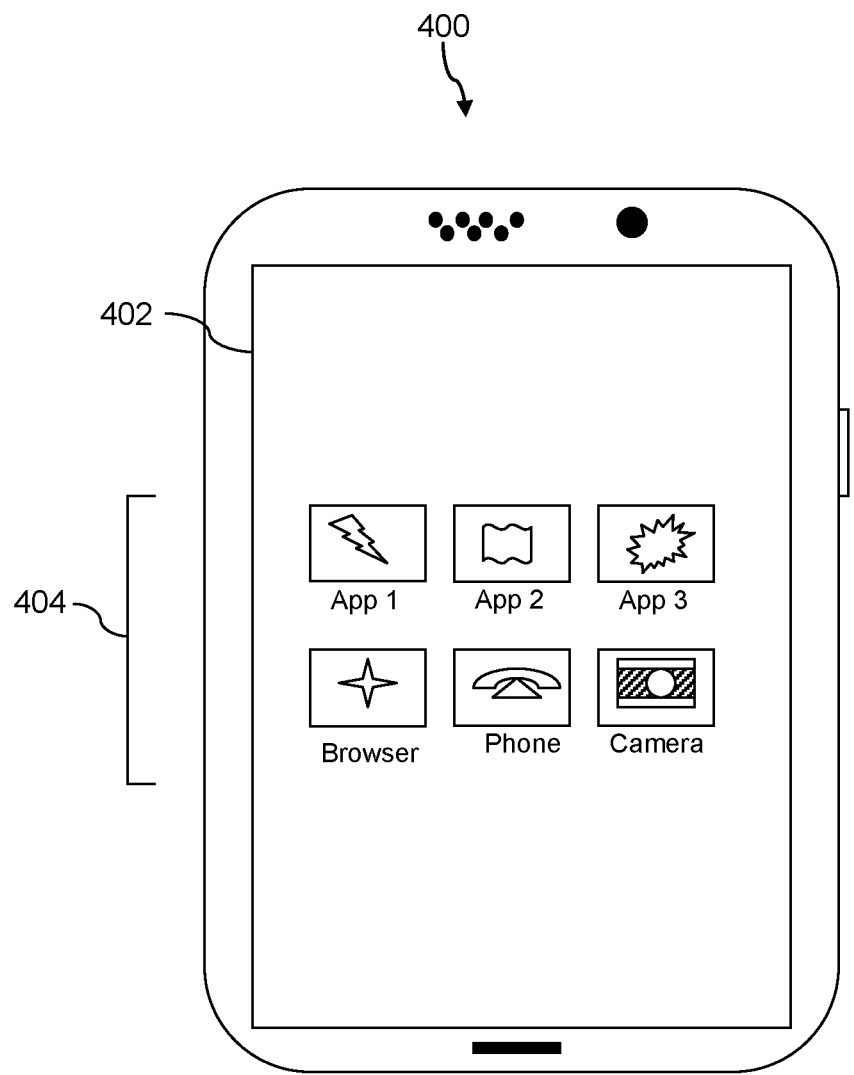
FIG. 4 is an illustration of a user equipment (UE) according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
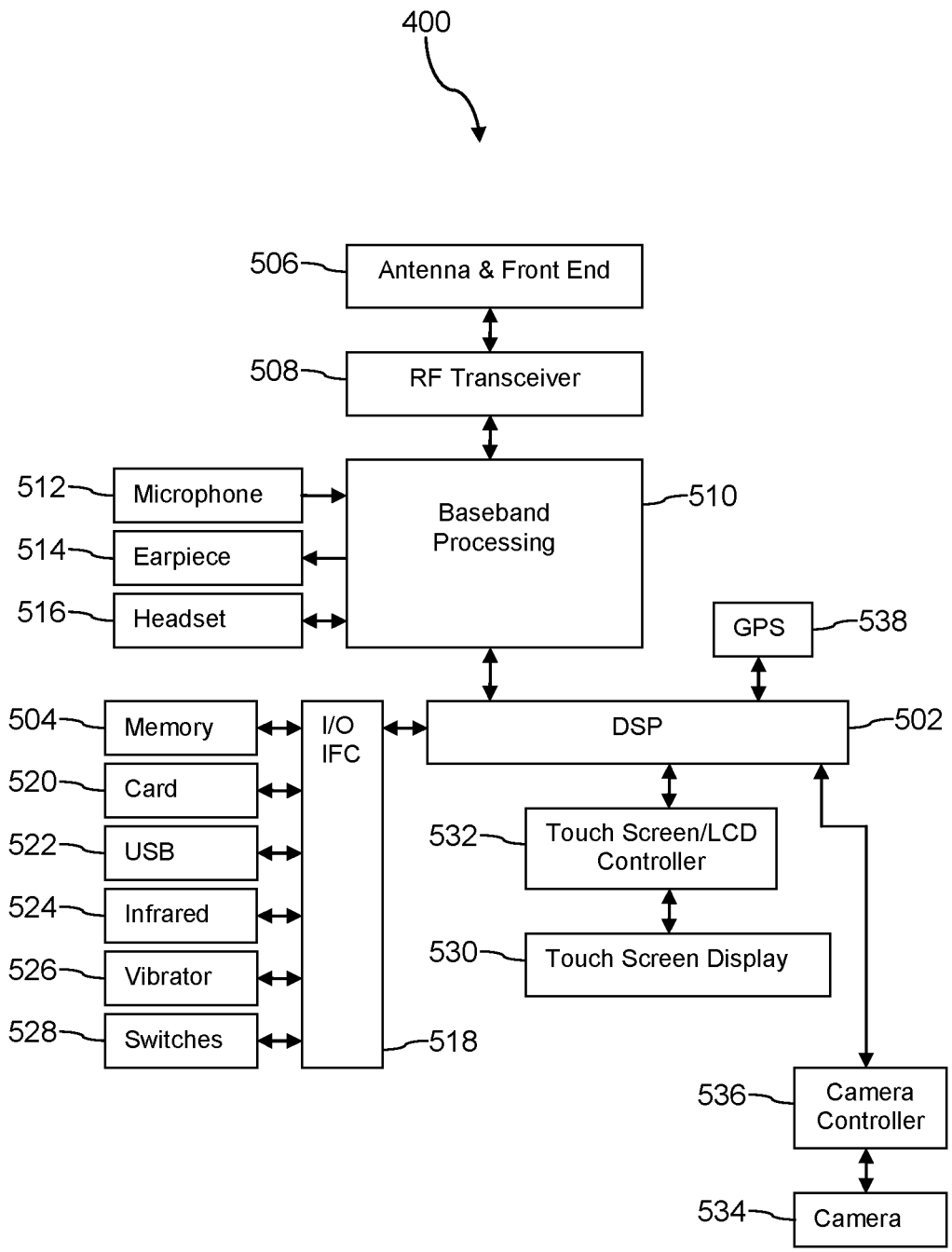
FIG. 5 is a block diagram of a hardware architecture according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
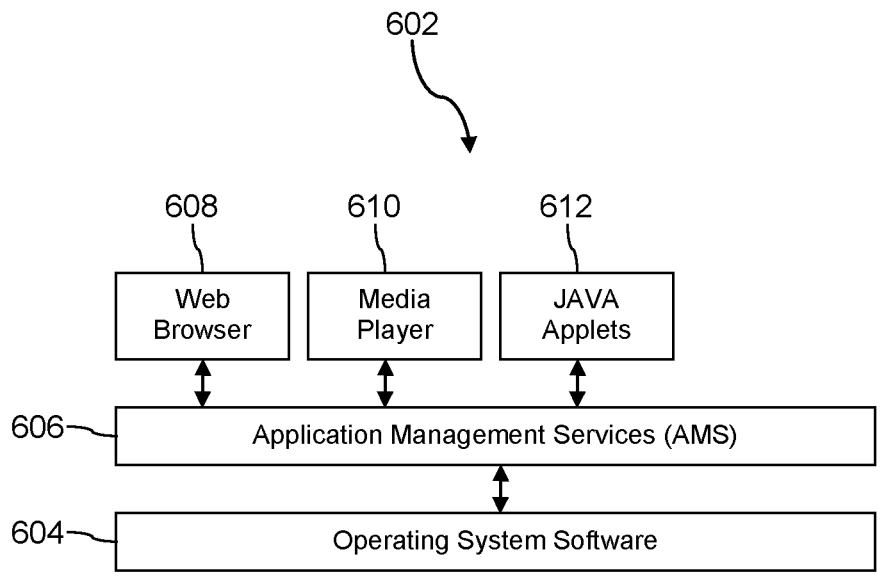
FIG. 6A is a block diagram of a software architecture according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
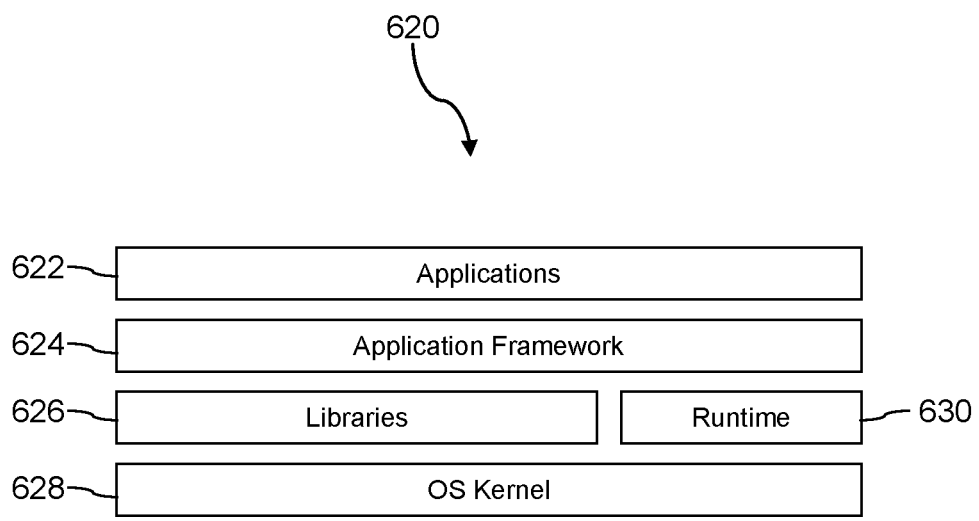
FIG. 6B is a block diagram of another software architecture according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
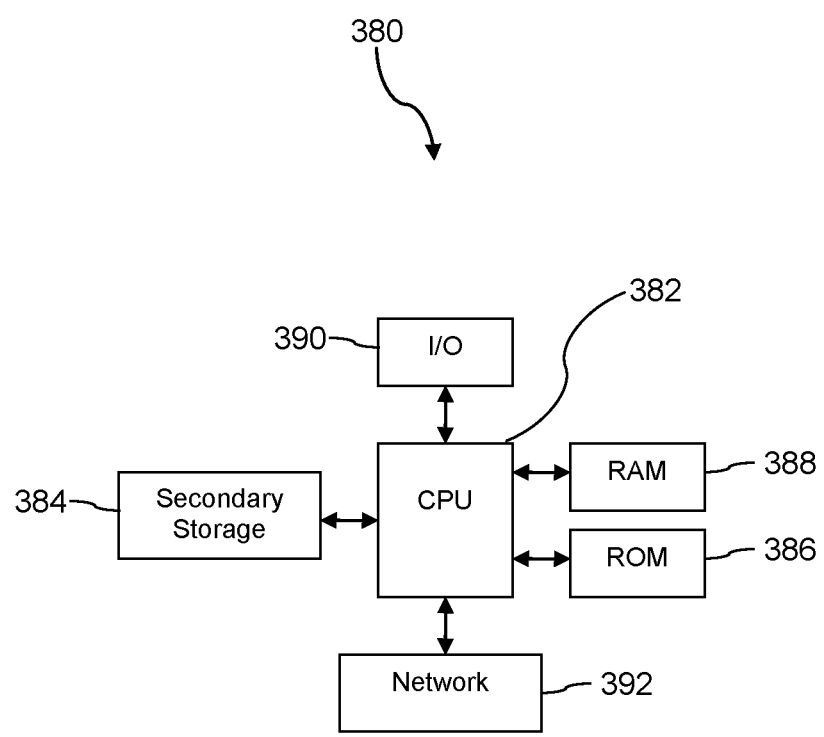
FIG. 7 is block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392.

While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electronic subscriber identity module (eSIM) profile delivery and activation system, the system comprising:
   a user equipment (UE) that comprises:
      an eSIM that is not initially provisioned with an eSIM profile;
      a WIFI transceiver;
      a non-transitory memory;
      a processor;
      an application stored in the non-transitory memory, that when executed by the processor:
         detects that the eSIM is not initially provisioned with an eSIM profile,
         in response to the detecting, requests via the WIFI transceiver a branding information handle from an over-the-air (OTA) platform,
         receives and stores via the WIFI transceiver the branding information handle from the OTA platform in the eSIM, and
         reboots at least one of the eSIM or a radio modem of the UE; and the radio modem, wherein after the rebooting, the radio modem is configured to:
receive the branding information handle stored in the eSIM,
determine which subscription manager data preparation (SMDP+) server to access based on the branding information handle,
obtain the eSIM profile from the SMDP+ server,
configure the eSIM profile into the eSIM, wherein the radio modem is rebooted after configuring the eSIM profile into the eSIM, and
subsequently communicate with a carrier specific OTA platform to finalize activation of the eSIM profile.

2. The system of claim 1, further comprising a dynamic configuration platform, wherein the dynamic configuration platform is configured to initiate a reboot of at least one of the eSIM or the radio modem prior to the detecting.

3. The system of claim 1, wherein the branding information handle comprises one or more of an integrated circuit card identifier, an international mobile subscriber identity, or a public land mobile network identifier.

4. The system of claim 1, wherein the eSIM profile comprises one or more of radio access network access credentials, a phone number or an international mobile subscriber identity, a preferred roaming list, one or more access point names, branding content, or executable applications.

5. The system of claim 1, further comprising the carrier specific OTA platform, wherein the carrier specific OTA platform is configured to program a phone number associated with the eSIM profile.

6. The system of claim 5, wherein the carrier specific OTA platform is configured to reassign the eSIM profile to a new account associated with the user or an existing account associated with the user after a trial period concludes and based on a request from a user to continue service associated with the eSIM profile.

7. The system of claim 1, wherein the UE comprises a mobile phone, a smart phone, a personal digital assistant (PDA), a media player, a wearable computer, a headset computer, a laptop computer, a notebook computer, a tablet computer, or an Internet of Things (IoT) device.

8. An electronic subscriber identity module (eSIM) profile delivery and activation method, the method comprising:
detecting, by an application stored in a non-transitory memory of a user equipment (UE) and executable by a processor of the UE, that an eSIM on the UE is not initially provisioned with an eSIM profile;
in response to the detecting, requesting, by the application via a WIFI transceiver of the UE, a branding information handle from an over-the-air (OTA) platform;
receiving and storing, by the application via the WIFI transceiver, the branding information handle from the OTA platform in the eSIM;
rebooting, by the application, at least one of the eSIM or a radio modem of the UE;
after rebooting, receiving, by the radio modem, the branding information handle stored in the eSIM;
determining, by the radio modem, which subscription manager data preparation (SMDP+) server to access based on the branding information handle;
obtaining, by the radio modem, the eSIM profile from the SMDP+ server;
configuring, by the radio modem, the eSIM profile into the eSIM;
rebooting the radio modem after configuring the eSIM profile into the eSIM; and
subsequently communicating, by the radio modem, with a carrier specific OTA platform to finalize activation of the eSIM profile.

9. The method of claim 8, further comprising rebooting, by the application, at least one of the eSIM or the radio modem prior to the detecting.

10. The method of 9, wherein the rebooting of the at least one of the eSIM or the radio modem prior to the detecting is initiated by a dynamic configuration platform.

11. The method of claim 8, wherein the branding information handle comprises one or more of an integrated circuit card identifier, an international mobile subscriber identity, or a public land mobile network identifier.

12. The method of claim 8, wherein the eSIM profile comprises one or more of radio access network access credentials, a phone number or an international mobile subscriber identity, a preferred roaming list, one or more access point names, branding content, or executable applications.

13. The method of claim 8, wherein finalizing activation of the eSIM profile comprises programming, by the carrier specific OTA platform, a phone number associated with the eSIM profile.

14. The method of claim 8, further comprising after a trial period concludes and based on a request from a user to continue service associated with the eSIM profile, reassigning, by the carrier specific OTA platform, the eSIM profile to a new account associated with the user or an existing account associated with the user.

15. The method of claim 8, wherein the UE comprises a mobile phone, a smart phone, a personal digital assistant (PDA), a media player, a wearable computer, a headset computer, a laptop computer, a notebook computer, a tablet computer, or an Internet of Things (IoT) device.

16. An electronic subscriber identity module (eSIM) profile delivery and activation method, the method comprising:
detecting, by an application stored in a non-transitory memory of a user equipment (UE) and executable by a processor of the UE, that an eSIM on the UE is not initially provisioned with an eSIM profile;
in response to the detecting, requesting, by the application via a WIFI transceiver of the UE, a branding information handle from an over-the-air (OTA) platform;
receiving and storing, by the application via the WIFI transceiver, the branding information handle from the OTA platform in the eSIM;
rebooting, by the application, at least one of the eSIM or a radio modem of the UE;
after rebooting, receiving, by the radio modem, the branding information handle stored in the eSIM;
determining, by the radio modem, which subscription manager data preparation (SMDP+) server to access based on the branding information handle;
obtaining, by the radio modem, the eSIM profile from the SMDP+ server;
configuring, by the radio modem, the eSIM profile into the eSIM;
rebooting the radio modem after configuring the eSIM profile into the eSIM;
subsequently communicating, by the radio modem, with a carrier specific OTA platform associated with a wireless communication service provider to finalize activation of the eSIM profile;

storing, by the carrier specific OTA platform, the eSIM profile in a database as associated with an entity other than a user of the UE during a trial period;

after the trial period concludes and based on a request from the user to continue service associated with the eSIM profile, creating, by the wireless communication service provider, a new account for the user or locating, by the wireless communication service provider, an existing account associated with the user; and reassigning, by the carrier specific OTA platform, the eSIM profile from the entity to the new account or the existing account.

17. The method of claim 16, further comprising updating, by the carrier specific OTA platform, the eSIM profile on the UE by sending one or more updated branding elements to the UE.

18. The method of claim 17, wherein the one or more updated branding elements comprises one or more different access point names.

19. The method of claim 16, wherein in the entity comprises an original equipment manufacturer of the UE or the wireless communications service provider.

20. The method of claim 16, wherein the UE comprises a mobile phone, a smart phone, a personal digital assistant (PDA), a media player, a wearable computer, a headset computer, a laptop computer, a notebook computer, a tablet computer, or an Internet of Things (IoT) device.

* * * * *